United States Patent [19]

Mouton

[11] Patent Number: 4,779,413
[45] Date of Patent: Oct. 25, 1988

[54] STARTER LUBRICATION SYSTEM FOR A TURBINE PLANT

[75] Inventor: Pierre C. Mouton, Grigny, France

[73] Assignee: Societe Nationale d'Etude et de Construction de Moteurs d'Aviation, Paris, France

[21] Appl. No.: 122,684

[22] Filed: Nov. 18, 1987

[30] Foreign Application Priority Data

Nov. 20, 1986 [FR] France ................ 86.16136

[51] Int. Cl.$^4$ .................. F02C 7/06; F02C 7/26
[52] U.S. Cl. ................... 60/39.08; 60/39.142; 184/6.3; 184/6.11
[58] Field of Search ............ 60/39.08, 39.142, 714; 184/6.3, 6.11, 11.1, 13.1; 415/175

[56] References Cited

U.S. PATENT DOCUMENTS

| | | | |
|---|---|---|---|
| 2,531,411 | 11/1950 | Davenport | 60/39.08 |
| 2,751,749 | 6/1956 | Newcomb | 60/39.08 |
| 2,757,656 | 8/1956 | Stegemann | 184/6.3 |
| 3,036,659 | 5/1962 | Crowson | 184/11 |
| 3,472,024 | 10/1969 | Strub et al. | 60/39.142 |
| 3,499,503 | 3/1970 | Murray et al. | 184/1 |
| 3,658,153 | 4/1972 | Berman | 184/6.3 |
| 4,105,093 | 8/1978 | Dickinson | 60/39.08 |
| 4,543,074 | 9/1985 | Ville et al. | 464/33 |

FOREIGN PATENT DOCUMENTS

| | | |
|---|---|---|
| 0059627 | 2/1982 | European Pat. Off. . |
| 221450 | 12/1908 | Fed. Rep. of Germany . |
| 2020349 | 7/1970 | France . |
| 2414146 | 1/1979 | France . |
| 2144804 | 3/1985 | United Kingdom . |

Primary Examiner—Louis J. Casaregola
Attorney, Agent, or Firm—Oblon, Fisher, Spivak, McClelland & Maier

[57] ABSTRACT

In a turbine plant having a starter housed in a starter chamber containing a splash lubrication oil bath, the plant lubrication circuit is arranged to feed clean oil to a non-polluting chamber disposed intermediate the starter chamber and the chamber of the power take-off unit of the plant. The partition separating the starter chamber and the intermediate chamber has at least one through passage so that the oil baths of the two chambers are in permanent communication, and the passage is fitted with a filtering strainer to prevent contaminants entering the intermediate chamber, and hence the plant lubrication circuit, from the starter chamber. The partition between the intermediate chamber and the chamber of the power take-off unit is provided with an overflow passage so that excess oil in the intermediate chamber flows freely into the power take-off chamber.

4 Claims, 2 Drawing Sheets

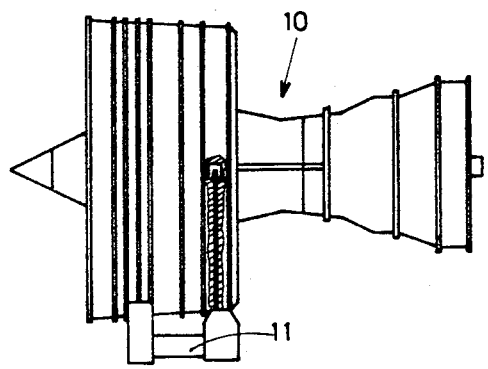
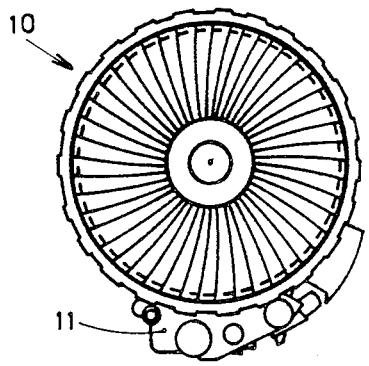
FIG:2A  FIG:2B
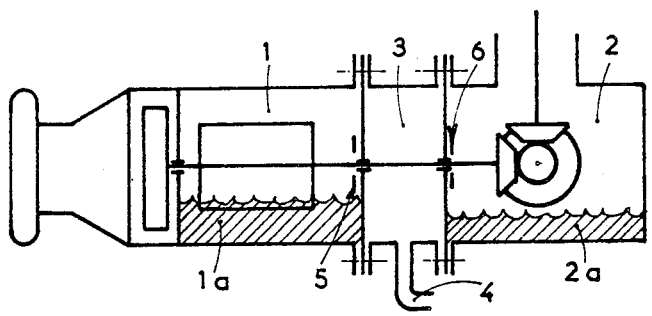
PRIOR ART  FIG:1
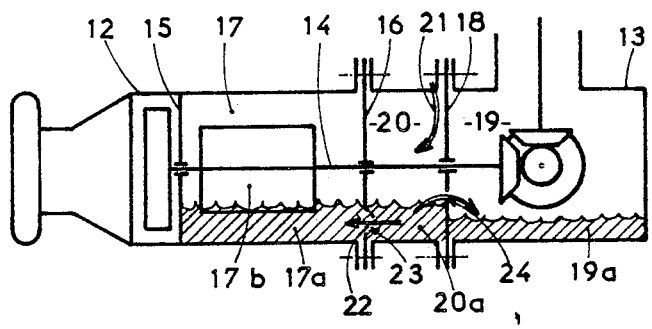
FIG:3

STARTER LUBRICATION SYSTEM FOR A TURBINE PLANT

BACKGROUND OF THE INVENTION

1. Field of the Invention

The present invention relates to a lubrication system for the starter of a turbine plant.

Usually, the starter of a turbine plant is integrated into a kinematic chain assembly which is united with the turbine plant and which also comprises a power take-off unit, a transmission shaft, and an accessory control unit from which, in particular, an oil pump, a fuel pump, a hydraulic pump and, in the case of aeronautical applications, various aircraft accessories are driven. When the turbine plant is started, the starter causes rotation of at least one rotary body of the plant through the power take-off unit and the transmission shaft. After starting, the kinematic chain is driven by the plant. The starter is a fragile piece of equipment, particularly if there is a lubrication failure, and damage to it may lead to damage throughout the entire kinematic linkage.

2. Summary of the Prior Art

In order to avoid this happening, various technical solutions have been proposed. Inter alia, disengagement means has been provided between the starter and the transmission line. This solution is illustrated, for example, in U.S. Pat. No. 4,543,074, in EP-A-0059 627, and in FR-A-2 020 349 and FR-A-2 414 146. One of the causes of breakdown due to breakage of the coupling arrangement between the starter and the turbine plant has been traced to lubrication faults which occur in the region of the starter.

One currently used starter lubrication system is shown diagrammatically in FIG. 1 of the accompanying drawings. The principle underlying this system resides in providing the starter with a lubrication system which is totally independent of the lubrication system of the turbine plant. To achieve this, the casing 1 of the starter is provided with an isolated oil bath 1a of limited capacity, and the lubrication is arranged to be of the splash type. The power take-off unit is lubricated by oil from the plant lubrication circuit and forms an independent enclosure 2 comprising an oil bath 2a. Provided between the two enclosures 1 and 2 is a dry interface cavity 3 which is drained at 4. Rotary transmission seals 5 and 6 ensure fluid-tightness between the cavity and each of the two enclosures. However, this arrangement does not provide for any continuous monitoring and if there is any error in filling the starter chamber 1 or any accidental leakage of oil therefrom, the resulting lubrication failure in the starter will give rise to breakages and lead to the serious consequences mentioned earlier.

Another known system involves lubricating the starter by a continuous circulation of oil from the oil supply circuit of the turbine plant. In this system, the oil is returned to the lubrication circuit of the turbine plant, which has the drawback that the oil of the plant becomes polluted by contamination from the starter. A system of this type is illustrated, for example, in GB-A-2144804. A filtering device can be provided, but this makes it necessary to provide for some by-pass in the event of the filter becoming clogged, with the result that it does not fully overcome the risk of the plant oil becoming contaminated or polluted.

The object of the invention is to avoid the disadvantages of the known starter lubrication systems described above, and to provide a system which will guarantee lubrication of the starter while ensuring complete protection of the turbine plant against the risk of its oil lubrication circuit becoming polluted by contamination emanating from the starter.

SUMMARY OF THE INVENTION

According to the invention, this object is achieved by providing, in a turbine plant including an oil lubrication circuit, a starter, a starter chamber housing said starter and containing a splash lubrication oil bath for lubrication of said starter, a non-polluting intermediate chamber disposed adjacent said starter chamber and connected to said lubrication circuit of said plant whereby said lubrication circuit supplies clean oil to said intermediate chamber, a separating partition between said starter chamber and said intermediate chamber, at least one hole provided in said separating partition communicating said intermediate chamber with said starter chamber to permit oil flow therebetween, filtering strainer means fitted in said at least one hole in said separating partition, a further chamber of said plant adapted to receive oil from said intermediate chamber with said further chamber whereby excess oil in said intermediate chamber flows into said further chamber.

Preferably, the further chamber of the turbine plant is defined by the casing of a power take-off unit in a kinematic chain of the plant, and the intermediate chamber is formed by an interfacial cavity between the starter chamber casing and the power take-off unit casing.

The oil bath in the starter chamber is filled with oil, and is topped up as necessary with clean oil from the intermediate chamber, the oil passing through the strainer means in the direction leading from the intermediate chamber to the starter chamber.

The main advantages of the starter lubrication system in accordance with the invention are that satisfactory and permanent lubrication of the starter is guaranteed, being provided by the lubrication system of the turbine plant and by the continuous monitoring of this system. At the same time, the plant is virtually isolated from any contamination originating from the starter, and it profits from the improved viability of the starter. This result makes it possible to classify the starter in a category of equipment capable of being replaced in an aircraft engine without any need to strip down the engine, which is advantageous from the maintenance point of view.

BRIEF DESCRIPTION OF THE DRAWINGS

FIG. 1 is a diagrammatic view illustrating the arrangement of a known turbine plant starter lubrication system as described earlier;

FIGS. 2A and 2B are diagrammatic side and front elevational views respectively of one example of a turbine plant in the form of an aero-engine indicating the location of the kinematic chain assembly of the power take-off unit;

FIG. 3 is a diagrammatic view similar to that of FIG. 1 but illustrating the principle of a turbine plant starter lubrication system in accordance with the invention; and, FIG. 4 is a longitudinal section in a plane passing through the axes of rotation of the starter and the transmission shaft of an embodiment of the invention including a starter lubrication system constructed according to the principle shown in FIG. 3.

DESCRIPTION OF THE PREFERRED EMBODIMENTS

Figure 4:
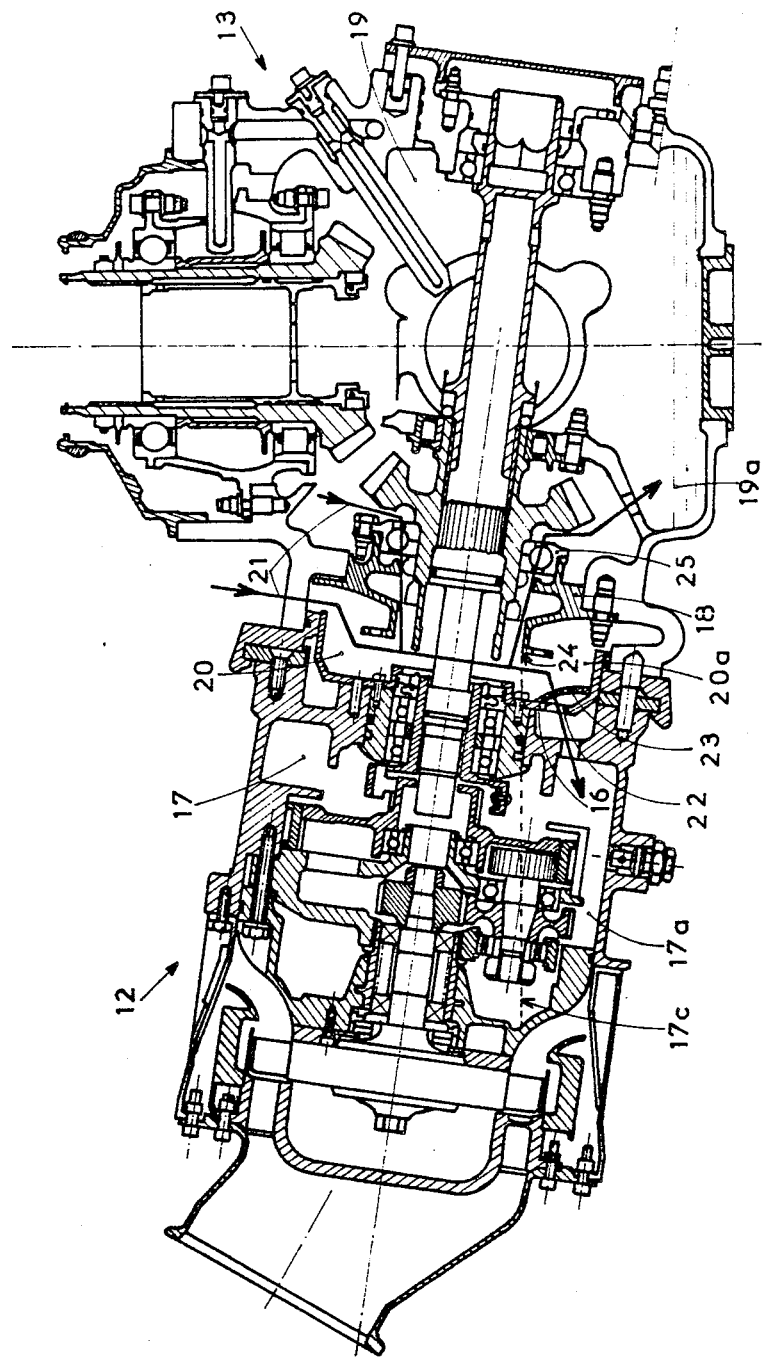

FIGS. 2A and 2B show an engine 10 of the turbo-fan type, comprising an assembly 11 which includes an accessory control box, a power take-off unit, a starter, and their transmission shafts. The starter 12 and the power take-off unit 13 are shown diagrammatically in FIG. 3. A transmission line 14 extends through partitions 15 and 16 which bound the starter chamber 17, and through a partition 18 which bounds part of the chamber 19 of the power take-off unit. Formed between the partitions 16 and 18 is an intermediate chamber 20 which constitutes an interfacial cavity between the starter and the power take-off unit of the engine. The interfacial cavity 20 comprises an oil bath 20a fed directly through an inlet connected to the oil distribution circuit of the engine, as indicated by the arrow 21.

The partition 16 separating the starter chamber 17 from the interfacial cavity 20 comprises, in the region of the oil bath 20a, a passage 22 protected by a filtering strainer 23 through which communication is established between the oil bath 20a and an oil bath 17a which is formed in the starter chamber 17 and which is thus permanently connected to the lubrication system of the engine. This oil bath 17a provides for permanent lubrication of the starter in that at least one gearwheel, such as 17b, is arranged to splash in the oil.

Between the interfacial cavity 20 and the starter chamber 17, the oil is thus capable of circulating through the filtering strainer 23 and in particular, if necessary, in the direction from the cavity 20 to the chamber 17. In the event of extensive contamination in the starter chamber oil bath 17a, the filtration strainer fulfils its protecting role and entails no risk of clogging. Oil circulation is therefore assured and the interfacial cavity 20 does not run the risk of being contaminated.

The separating partition 18 between the interfacial cavity 20 and the chamber 19 of the power take-off unit likewise comprises a through passage, which forms an overflow 24 permitting a continuous flow of excess clean oil from the bath 20a to the bath 19a which is formed in the chamber 19 of the power take-off unit. By the means which have been described above, the oil in the baths 20a and 19a respectively formed in the interfacial cavity 20 and the chamber 19 of the power take-off unit, which enters the oil circulation system of the engine, is thus constantly maintained clean and protected from any pollution which might emanate from the starter.

In the embodiment shown in FIG. 4, the various elements which have been described with reference to FIG. 3 may be seen: a starter 12 and a power take-off unit 13, with their respective chambers 17 and 19; an intermediate chamber 20 and its partitions 16 and 18; the passage 22 and its associated filter 23 in the partition 16; the overflow 24 in the partition 18; and the inlet 21 for oil from the engine to pass into the chamber 20 either directly and/or through a roller 25. Also shown are the oil baths 17a of the starter, 20a of the intermediate chamber, and 19a of the power take-off unit. A result of the arrangement shown is that the oil level in the starter chamber, shown by the line 17c in FIG. 4, is fixed by the height of the overflow edge 24, levelling between the baths 17a and 20a taking place via the filter 23.

What is claimed is:

1. In a turbine plant including an oil lubrication circuit,
   a starter,
   a starter chamber housing said starter and containing a splash lubrication oil bath for lubrication of said starter,
   a non-polluting intermediate chamber disposed adjacent said starter chamber and connected to said lubrication circuit of said plant whereby said lubrication circuit supplies clean oil to said intermediate chamber,
   a separating partition between said starter chamber and said intermediate chamber,
   at least one hole provided in said separating partition communicating said intermediate chamber with said starter chamber to permit oil flow therebetween,
   filtering strainer means fitted in said at least one hole in said separating partition,
   a further chamber of said plant adapted to receive oil from said intermediate chamber, and
   overflow means communicating said intermediate chamber with said further chamber whereby excess oil in said intermediate chamber flows into said further chamber.

2. A turbine plant according to claim 1, wherein said plant includes a power take-off unit in a kinematic chain of said plant, said power take-off unit including a casing which defines said further chamber of said plant.

3. A turbine plant according to claim 2, including means defining an interfacial cavity between said starter chamber and said power take-off unit casing, said interfacial cavity providing said intermediate chamber.

4. A turbine plant according to claim 1, wherein clean oil passes through said filtration strainer means from said intermediate chamber to said starter chamber.

* * * * *

UNITED STATES PATENT AND TRADEMARK OFFICE
CERTIFICATE OF CORRECTION

PATENT NO. : 4,779,413
DATED : October 25, 1988
INVENTOR(S) : Pierre C. MOUTON

It is certified that error appears in the above-identified patent and that said Letters Patent is hereby corrected as shown below:

Column 2, Line 23, insert the following after the word "chamber":

--, and overflow means communicating said intermediate chamber--

Column 3, line 35, "fulfils" should read --fulfills--

Signed and Sealed this

Eighteenth Day of April, 1989

Attest:

DONALD J. QUIGG

*Attesting Officer*    *Commissioner of Patents and Trademarks*